Oct. 19, 1965   E. G. GRIFFITH   3,212,623
CONVEYOR DELIVERY SYSTEM
Filed Oct. 27, 1961   4 Sheets-Sheet 1
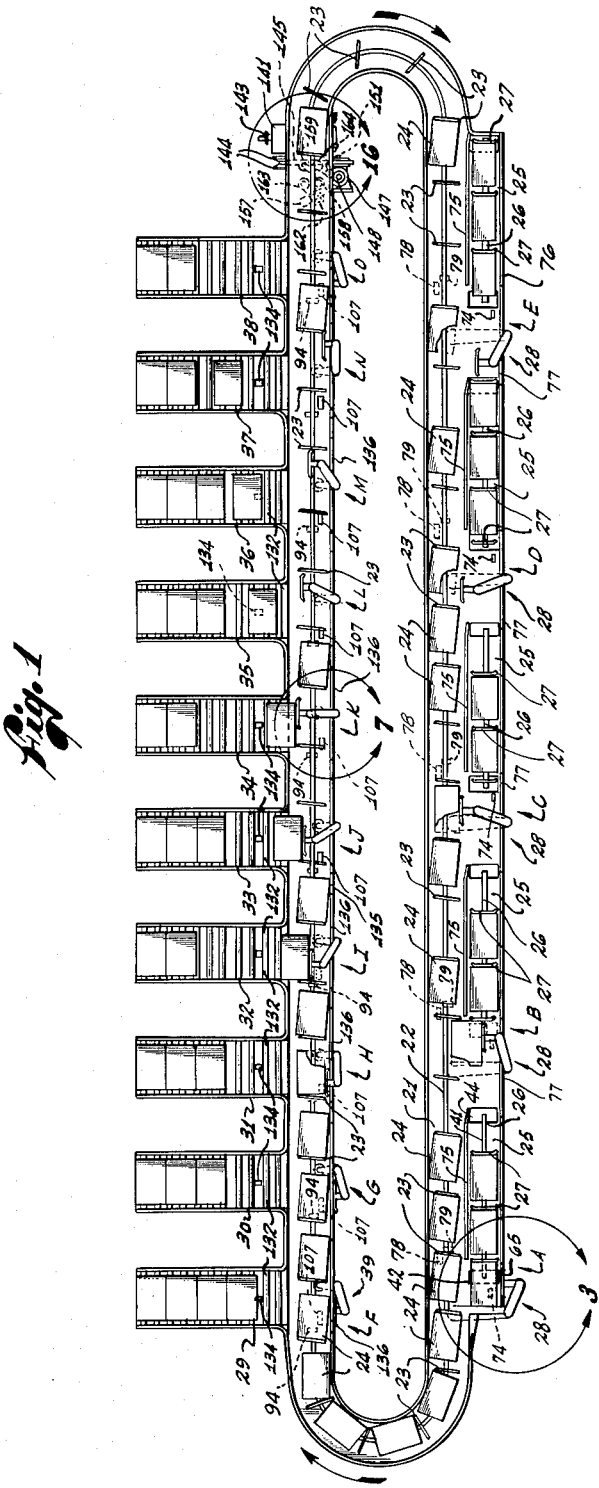
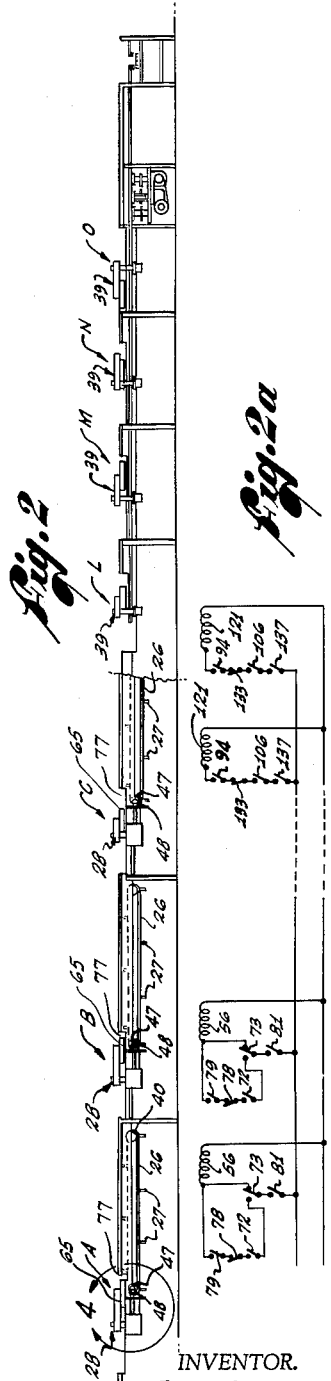
INVENTOR.
EARL G. GRIFFITH
BY
ATTORNEYS Oct. 19, 1965  E. G. GRIFFITH  3,212,623
CONVEYOR DELIVERY SYSTEM
Filed Oct. 27, 1961  4 Sheets-Sheet 2

INVENTOR.
EARL G. GRIFFITH
BY Fulwider Mattingly & Huntley
ATTORNEYS

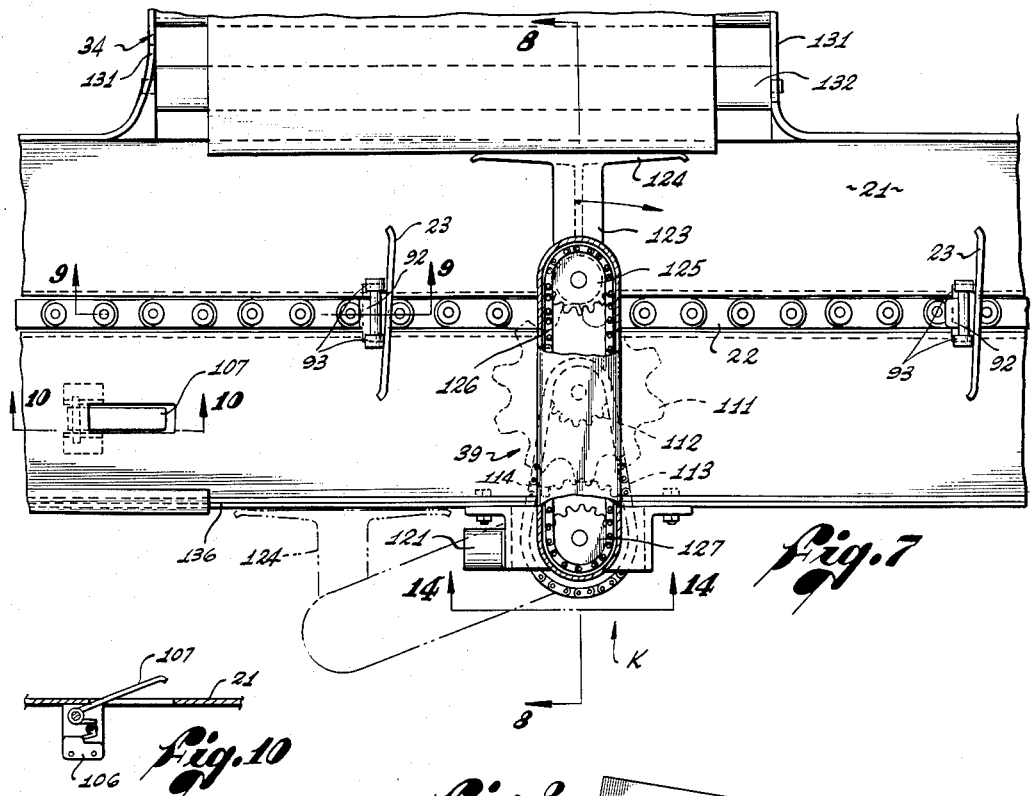
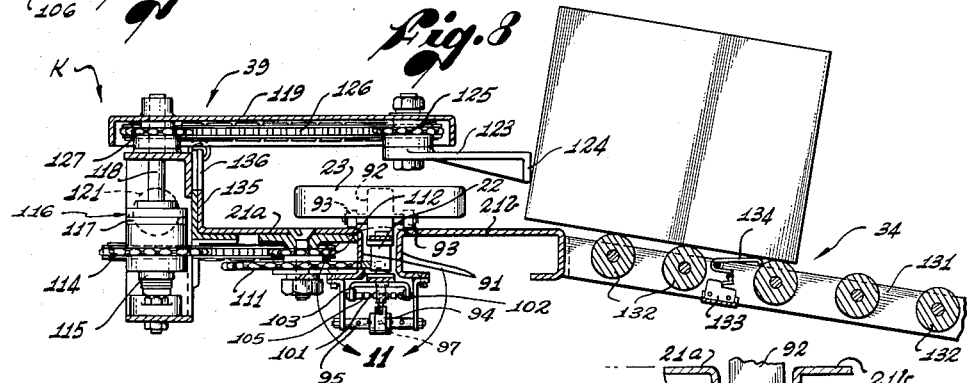
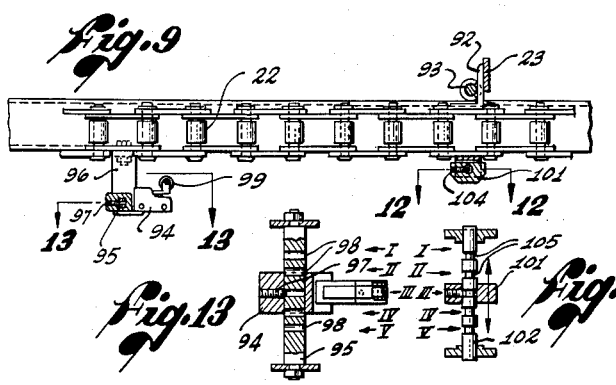
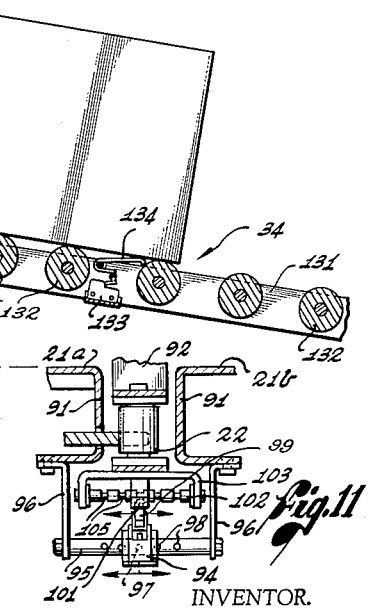
INVENTOR.
EARL G. GRIFFITH
BY Fulwider Mattingly & Huntley
ATTORNEYS

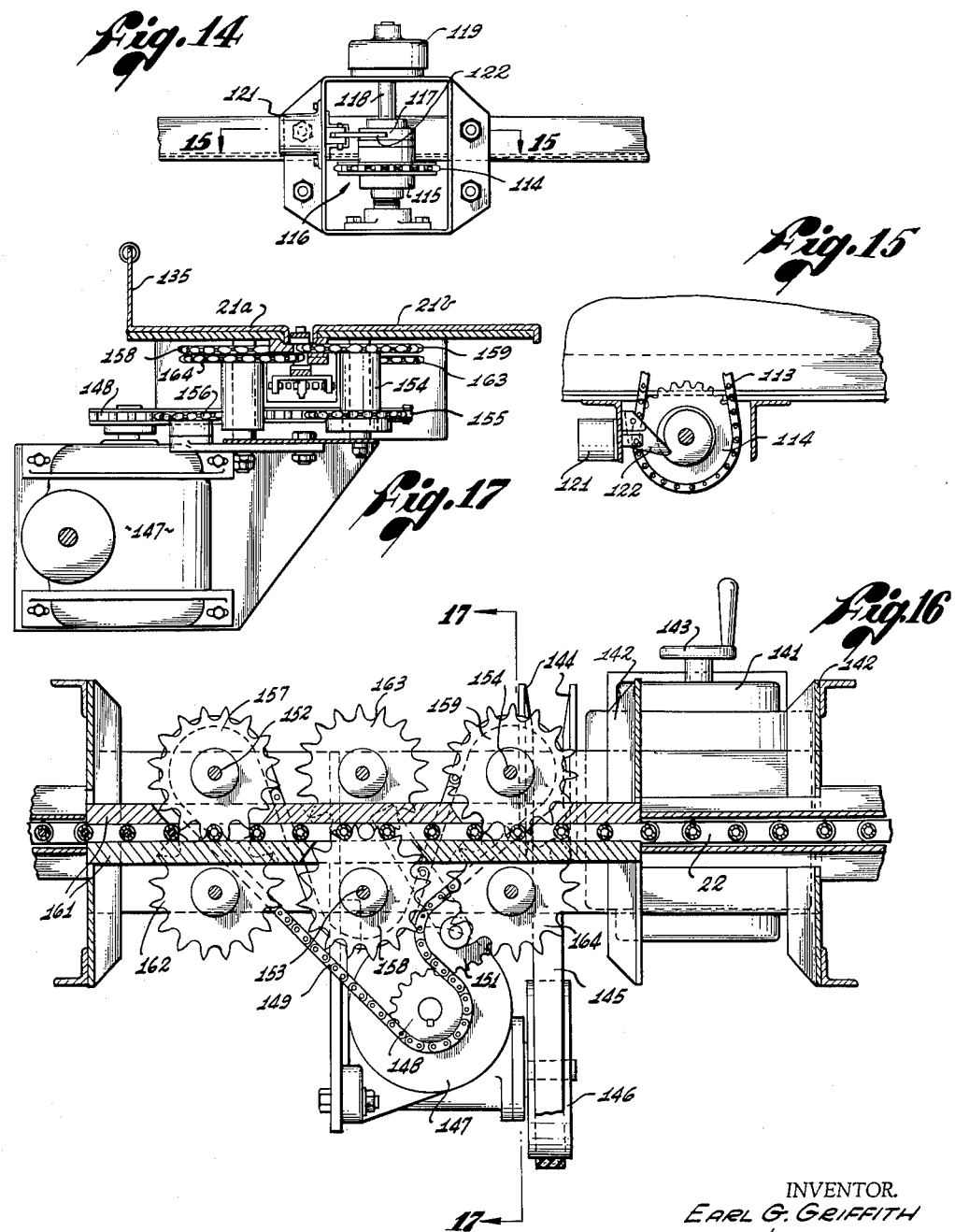

United States Patent Office 3,212,623
Patented Oct. 19, 1965

3,212,623
CONVEYOR DELIVERY SYSTEM
Earl G. Griffith, 9155 Sheridell Ave., Downey, Calif.
Filed Oct. 27, 1961, Ser. No. 148,183
5 Claims. (Cl. 198—38)

The present invention relates generally to conveyor delivery systems, and more particularly to a method and apparatus for selectively moving varied articles from a multiplicity of feeding stations to a multiplicity of receiving stations in accordance with predetermined requirements at the receiving stations.

One object of the present invention is to provide an improved method and apparatus for the selective delivery of various articles to a multiplicity of receiving stations without the use of coding marks or indicators on the articles, or tripping means actuated by the articles themselves.

Another object of this invention is the provision of an improved method and apparatus for selectively feeding various articles to a multiplicity of receiving stations, which facilitate changing the article selected for delivery to a certain station or group of stations.

A further object of this invention is the provision of an improved selective conveyor delivery system providing for maximum versatility in the location of feeding and delivery stations with respect to the conveyor and in the selection of an article to be delivered to a given station.

Yet another object of this invention is the provision of an improved conveyor delivery system including improved means for moving articles to be delivered onto and off the conveyor.

A still further object of this invention is the provision of an improved conveyor delivery system employing coding means identifying spaces on the conveyor which actuate control means at feeding and delivery stations to move selected articles into and out of the identified or coded conveyor spaces, and with at least the delivery station control means adjustable for operation by different coding means on the conveyor to select the article in a particular conveyor space to be delivered to a given delivery station.

These and other objects and features of the invention will be readily apparent to those skilled in the art from the following specification and the appended drawings in which:

FIGURE 1 is a plan view of a conveyor delivery system according to the present invention;

FIGURE 2 is a broken elevational view showing feeding stations at the left and delivery stations at the right;

FIGURE 2a is a schematic wiring diagram for the control of the feeding and delivery stations;

FIGURE 7 is an enlarged plan view, partly in section, of the area within the circle 7 of FIGURE 1;

FIGURE 8 is a transverse sectional view on the line 8—8 of FIGURE 7;

FIGURE 9 is a detail sectional view on the line 9—9 of FIGURE 7;

FIGURE 10 is a detail sectional view on the line 10—10 of FIGURE 7;

FIGURE 11 is an enlarged detail view of the area within the circle 11 of FIGURE 8;

FIGURE 12 is a detail sectional view on the line 12—12 of FIGURE 9;

FIGURE 13 is a detail sectional view on the line 13—13 of FIGURE 9;

FIGURE 14 is a detail elevational view from the line 14—14 of FIGURE 7;

FIGURE 15 is a detail sectional view on the line 15—15 of FIGURE 14;

FIGURE 16 is a horizontal sectional view of the drive mechanism of the main conveyor taken in the area of the circle 16 of FIGURE 1; and FIGURE 17 is a sectional view on the line 17—17 of FIGURE 16.

Figure 3:
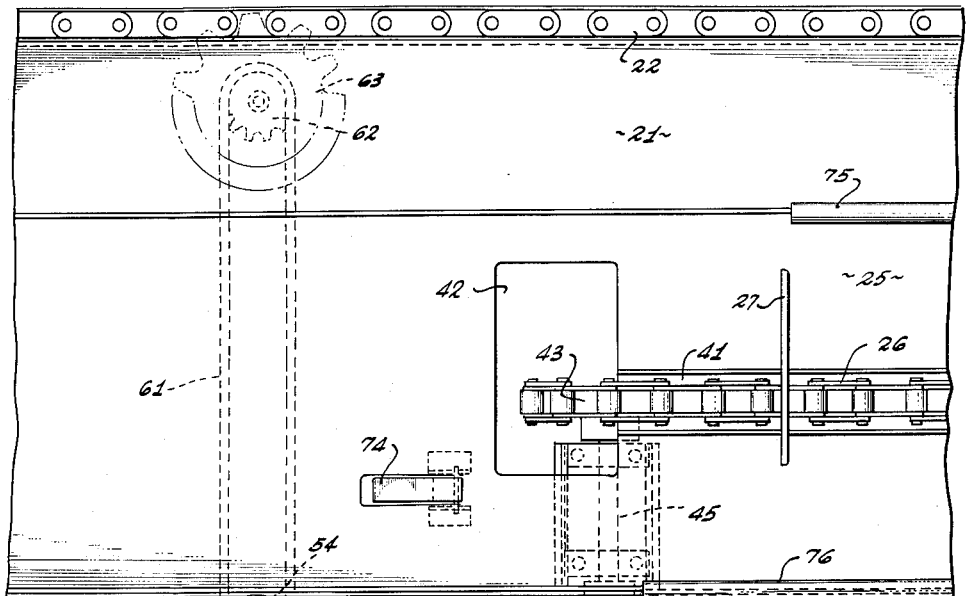
FIGURE 3 is an enlarged detail plan view of the area within the circle 3 of FIGURE 1.

As shown in FIGURES 1 and 2, the conveyor delivery system according to the present invention includes five feeding stations generally designated A, B, C, D and E; and ten delivery stations generally designated F, G, H, I, J, K, L, M, N and O. It will be understood that any number of feeding and delivery or discharge stations may be utilized in the system, the numbers five and ten having been arbitrarily chosen for purposes of illustration only.

The main conveyor unit is illustrated as embodying an oblong platform 21 about which runs an endless conveying element shown as an edgewise mounted chain 22, to which are attached a plurality of spaced pusher bars 23, between which are received the articles 24 which are to be moved from the feeding stations to the delivery or discharge stations by the conveyor system.

Each of the feeding stations A through E comprises a loading platform 25 and an endless chain 26 carrying a plurality of pusher bars 27 thereover. The articles 24 may be manually loaded upon the loading platforms 25 between successive pusher bars 27. At the forward end of each of the feeding stations is mounted a transfer device 28 for moving the articles from the loading platform 25 to the main conveyor platform 21.

Each of the delivery stations F through O cooperates with a delivery chute 29 through 38, respectively, and each includes a transfer device 39 for moving an article from the conveyor platform 21 into its associated delivery chute when the coding of the station and the conveyor space conform.

Figure 4:
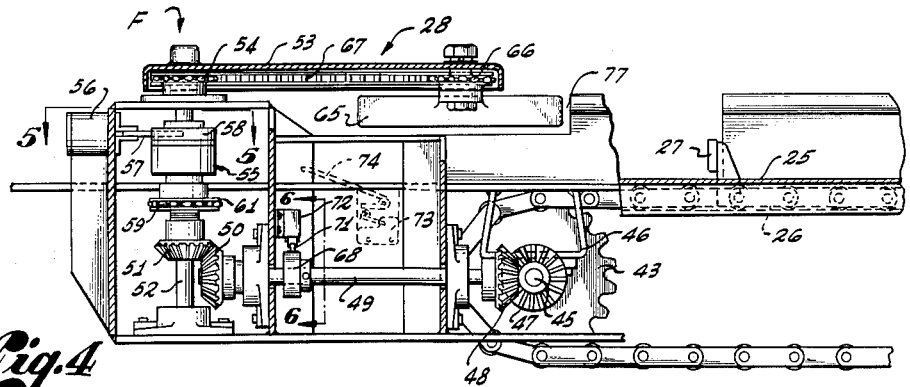
FIGURE 4 is an enlarged detail elevational view, partly in section, of the area within the circle 4 of FIGURE 2.
Figure 5:
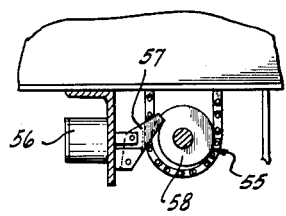
FIGURE 5 is a detail sectional view on the line 5—5 of FIGURE 4.
Figure 6:
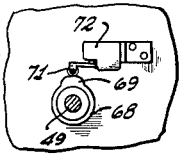
FIGURE 6 is a detail sectional view on the line 6—6 of FIGURE 4.

Feeding station A (the structure of which is duplicated at feeding stations B, C, D and E) is shown in enlarged detail in FIGURES 3 through 6. The loading platform 25 is provided with an upper channel 41 within which rides the endless chain 26 to which the pusher bars 27 are attached. An opening 42, over a chain drive sprocket 43, passes the bars 27 to the underside of the platform for their return movement. An idler sprocket 40 engages the opposite end of the loop of the chain 26 beneath an opening 44 (FIGURE 1) through which the pusher bars 27 rise.

The drive sprocket 43 is rigidly mounted upon one end of a shaft 45 rotatably carried by brackets 46 beneath the platform 25. At the opposite end of the shaft 45 is mounted a conical gear 47 meshing with a similar conical gear 48 rigid with a rotatable shaft 49. The shaft 49 carries a second conical gear 50 meshing with a fourth conical gear 51 rigidly mounted on a rotatable shaft 52. An arm 53 is rigidly mounted on the upper end of the shaft 52. A stationary sprocket 54 is mounted coaxially with the shaft 52.

A one revolution clutch, indicated generally at 55, is controlled by a solenoid 56 retracting a pawl 57 normally spring biased to engage an element 58 of the clutch 55. A rotatable sprocket 59 is connected by an endless chain 61 to a second sprocket 62 which is rigidly connected to a third sprocket 63 meshing with the main conveyor chain 22. The sprocket 59 thus rotates continuously with the conveyor chain 22 to drive one element of the clutch 55. The other element 58 of the clutch 55 is connected to the shaft 52 and is permitted to rotate with the sprocket 59 when the pawl 57 is withdrawn by energization of the solenoid 56. The operation of the one revolution clutch 55 is such that after deenergization of the solenoid 56 the clutch continues to operate to rotate the element 58 and shaft 52 until the pawl 57 again engages with the stop on the element 58, at which time the clutch is disengaged.

Pivotally mounted at the free end of the arm 53 is an arm 64 carrying a transfer pusher bar 65. A sprocket 66 is rigidly connected to the arm 64 to rotate therewith and the stationary sprocket 54 and rotatable sprocket 66 are interconnected by an endless chain 67 disposed within the arm 53. The operation of the sprocket and chain connection 54, 67, 66 is to effect rotation of the sprocket 66 and arm 64 relative to the arm 53 as arm 53 is rotated, thereby maintaining the pusher bar 65 at all times parallel to the axes of the platforms 21 and 25.

A cam 68 is secured to the shaft 49 for rotation therewith and has a rise 69 thereon cooperating with a follower 71 to effect operation of a normally open switch 72. A double throw switch 73 is mounted beneath the platform 25 and has an operator 74 extending through an opening through the platform into a position to be engaged by an article disposed on the platform 25 in feeding transfer position.

A rail 75 separates the platforms 21 and 25 except at the transfer position. A rail 76 is disposed at the outside edge of the platform 25 and is cut away at 77 to provide passage for the pusher bar 65.

Adjacent to each of the feeding transfer positions of stations A through E, the main conveyor platform 21 is provided with a normally closed switch 78 having an operator extending above the platform in position to be engaged by articles 24 passing along the platform. Each of the feeding stations A through E is also provided with an on-off manual activating and inactivating switch 81 (FIGURE 2a).

FIGURES 7 through 15 show in enlarged detail the area of delivery station K within the circle 7 of FIGURE 1. FIGURES 8 and 11 show that the main conveyor platform 21 is made up of two concentric sections, 21a and 21b, having opposed flanges 91 between which runs the endless chain 22. The pusher bars 23 are shown connected to the chain 22 by means of brackets 92 upon which are mounted supporting rollers 93 which ride upon the top surface of the platform 21 to support the chain 22.

Adjacent to each of the delivery stations F through O, and also adjacent to each of the loading stations A through E, are mounted transversely adjustable, normally open switches designated 79 for the loading stations and 94 for the delivery stations. The switches 94 (and switches 79, if desired) are adjustably mounted on transverse bars 95 suspended from the flanges 91 by brackets 96. Switches 94 are provided with spring plungers 97 indexing with a number of notches or holes 98 in the transversely adjusted positions of the switches. Each switch 94 is provided with a follower operator 99 adapted to be engaged by a complementarily located, transversely adjustable lug 101 mounted on a rod 102 suspended by a bracket 103 from the chain 22 beneath each pusher bar 23. The lugs 101 are also provided with spring plungers 104 cooperating with spaced grooves 105 in the rods 102 to determine the transversely adjusted positions of the lugs 101. A coding lug 101 is provided beneath each of the pusher bars 23 on the chain 22 and a normally open coding switch 79 or 94 is provided adjacent each of the feeding and delivery stations A through O. The lugs 101 will engage and operate those of the switches 79 and 94 which are physically aligned therewith.

The coding switches 79 adjacent to the feeding stations A through E may be permanently located, one in each of the transverse positions across the conveyor, in what will be identified, reading from the outside edge of the conveyor inwardly, as positions I, II, III, IV, V. There is normally no reason why the positions of the switches identifying the feeding stations should be varied, as will be explained hereinafter. However, for complete versatility, the feeding station coding switches 79 may have the same form and laterally adjustable structure as illustrated for the delivery station coding switches 94 in FIGURES 8, 9, 11 and 13.

Each of the delivery stations, F through O, may be provided with a normally open switch 106 having operator 107 disposed above the platform 21 in position to be engaged by an article 24 passing along the platform. Each of the delivery stations may also be provided with a manual on-off, activating and inactivating switch 137.

Beneath the platform section 21a is disposed a large sprocket 111 meshing with the chain 22 and carrying a second sprocket 112 for rotation therewith. Sprocket 112 drives a chain 113 which in turn drives a sprocket 114 mounted on one element 115 of a one revolution clutch 116. The other element 117 of the clutch 116 is connected to a shaft 118 upon which is mounted an arm 119. A solenoid 121 controls a spring biased pawl 122 to release the element 117 and shaft 118 for one revolution until the released pawl again engages the stop in the element 117. Pivotally mounted on the free end of the arm 119 is an arm 123 carrying a transfer pusher bar 124. A sprocket 125 is mounted to rotate with the arm 123 and is connected by a chain 126 within the arm 119 to a stationary sprocket 127 coaxial with the shaft 118. The function of sprockets 125, 127 and chain 126 is to maintain the pusher bar 124 at all times parallel to the axis of platform 21, as the arm 119 is rotated.

Each of the discharge chutes 29 through 38 comprises a pair of side bars 131 connected to the outside edge of platform 21 and between which are rotatably mounted conveyor rolls 132. The plane of the rolls 132 is preferably inclined to the horizontal so that articles pushed thereon from the conveyor platform 21 will move down the discharge chute roller conveyor by gravity. A normally closed electrical switch 133 is mounted in each discharge chute and has an operator 134 in position to be engaged by articles disposed thereabove on the rolls 132. As shown in FIGURE 8, the conveyor platform section 21a is provided with a rail 135 cut away at 136 to accommodate the pusher bar 124.

One manner of driving the main conveyor chain 22 is shown in FIGURES 16 and 17, illustrating the area within the circle 16 of FIGURE 1. A driving motor 141 is adjustably mounted on suitable supporting brackets 142 with its position adjustable by a handwheel 143, in known manner, to control the spacing of an adjustable pulley 144 to vary the speed of a belt 145 driving the pulley 146 of a gear reduction box 147. The output of the gear reduction box 147 is to a sprocket 148 which is engaged by a drive chain 149. The chain 149 is tensioned by an idler sprocket 151 and drives three sprockets mounted on shafts 152, 153 and 154. The sprocket for shaft 154 is shown at 155 and the sprocket for shaft 153 at 156 (FIGURE 17). Shafts 152, 153 and 154 carry sprockets 157, 158 and 159, respectively, which mesh with the chain 22. At the driving area the chain 22 passes between abutting plates 161 and the drive sprockets 157, 158 and 159 are opposed by idler sprockets 162, 163 and 164, respectively, to avoid side thrust friction on the chain.

The positions of the feeding station coding switches 79 and of the delivery station coding switches 94 are both designated by Roman numerals I through V, reading from the outside edge of the conveyor system inwardly in each case. The positions of the coding lugs 101 identifying the article spaces between the pusher bars 23 are likewise designated I through V from the outside edge of the conveyor system inwardly.

The main conveyor system is shown as providing forty-nine article receiving spaces between the pusher bars 23, this number being selected for representation only. The positions of the lugs 101 identifying these spaces will determine the particular feeding station, A through E, which will transfer its article into the article space with which a coding lug is associated. If the operation of the system is such that uniform quantities of the different articles are being used, then each lug position, I through V, could have the same number of coding lugs placed therein and in the specific example shown this would be ten each in four of the lug positions and nine in the fifth. However, it is ordinarily inadvisable to code the feeds uniformly since in ordinary operation the usage of the different articles will vary. One example of a capacity division would be fourteen article spaces having lug position I, twelve for II, ten for III, eight for IV and five for V. In such a division the article being most heavily used at any one time would use feed I which has, by way of example, been assigned to station A by setting its coding switch in position I. Under the above example, the most lightly used article would use feed V which, according to the given convention of identification would be station E.

When more articles are to be fed than are provided for by the highest division of the coding lugs, two or more delivery stations can be combined to deliver the same article. Thus, if the same article is fed from both feeding stations A and B in the example of the last paragraph, there will be twenty-six feeds of that particular article per revolution of the conveyor chain 22.

The coding lugs may be intermixed in their positions about the conveyor, a desirable arrangement in the above divisional example being obtained by locating the code lugs in the order I, II, III, I, IV, II, V, I, III, II, I, IV, V, II, I, III, IV, I, II, V, III, I, II, IV, etc., or in any other desired order. Any such lug order or division may be readily changed at any time by a simple transverse movement of the conveyor lugs from one position to another.

The above positions of the coding switches 79 at the feeding stations and of the conveyor coding lugs 101 may be relatively permanent and variations in delivery be secured by selecting the article loaded at a particular feeding station and by varying the positions of the coding switches 94 for the delivery stations F through O. The setting of these delivery or discharge coding switches will be determined by the rapidity with which the articles are removed from the discharge chutes 29 through 38, which will, in turn, ordinarily be governed by the usage of the particular article under consideration. Thus, if the largest number of articles, corresponding to coding position I in the example, can be used in two discharge positions, then only two of the delivery station coding switches 94 may be set in the I position. On the other hand, if four discharge positions are utilizing this particular article, then the four corresponding coding switches will be placed in the I position. Similarly, the coding switch 94 for each of the stations F through O will be placed in the coding position to secure that article from the conveyor which its discharge chute is to supply.

By the adjustment of any coding switch 94 into any coding position, any of the delivery stations F through O and its associated discharge chute may be coded to select the article corresponding to any of the lug positions and any number of desired delivery stations may be coded to take the articles identified by a given lug position. Hence, the feeding of any particular article into a given conveyor article space and the delivery of any desired article from a particular conveyor space to a discharge chute is completely versatile and may be controlled by selection of the articles fed to the different feeding stations and by varying the coding positions of the coding switches and lugs.

In describing the method and apparatus of the conveyor delivery system it will be assumed that the coding switches and lugs have been positioned in accordance with the example above given, and that the conveyor chain 22 is being moved along the conveyor platform 21 by its drive motor 141 at a speed determined by the setting of the variable pulley 144. The drive runs from motor 141, adjustable pulley 144, belt 145, pulley 146, gear box 147 to sprocket 148 which moves the drive chain 149. The chain 149 meshes with the sprockets on the shafts 152, 153 and 154 to rotate the shafts and therewith the sprockets 157, 158 and 159 which mesh with and drive the main conveyor chain 22. Manual control switches 81 and 137 are closed. Selected articles 24 are fed to the loading stations A, B, C, D and E by placing them on the loading conveyor platforms 25 between the pusher bars 27.

Assuming that there is no article located in the transfer position of feeding station A, switch 73 is in its unoperated position and a circuit is closed through its normally closed contacts to the solenoid 56. Energization of the solenoid 56 of station A retracts the pawl 57 and permits clutch 55 to interconnect the sprocket 59 and the shaft 52 for common rotation. Sprocket 59 is continuously driven from the main conveyor chain 22 through sprockets 62 and 63 and chain 61. Rotation of shaft 52 rotates shaft 49, through the gears 51 and 50, which in turn rotates sprocket 43 through the gears 48 and 47. Rotation of sprocket 43 drives the feeding station conveyor chain 26 to move the pusher bars 27 along the platform 25. Rotation of shaft 52 also rotates the transfer pusher bar 65 in timed relation to pusher bars 27 but without effect, since it was assumed that no article is in transfer position.

As an article 24 is moved along the platform 25 toward the transfer position, it will engage actuator 74 and operate switch 73 to open its normally closed contacts and close its normally open contacts. Opening of the normally closed contacts of switch 73 de-energizes the solenoid 56, but the clutch 55 continues to rotate until the pawl 57 engages in the stop on the clutch element 58. When the clutch 55 stops, the article will be fully in the transfer position, the pusher bar 65 in position to effect transfer and the cam rise 69 will be engaged with the follower 71 to operate the switch 72 to closed position and set up the circuit to the coding switch 79. It will be noted that should the coding switch 79 be closed after the switch 73 is operated but before the article is fully in its transfer position, the coding circuit will not be completed because of the normally open switch 72.

Assume now that an article is in transfer position at a feeding station and that a coding lug 101 closes the coding switch 79 for that feeding station. If switch 78 is closed, indicating that the article space on the main conveyor is open, the coding circuit is completed to the solenoid 56 and it retracts the pawl 57 to permit the one revolution clutch 55 to start rotation. As the lug will leave the coding switch soon after its actuation, the actuated switch 79 will move back to its open position but the clutch 55 will continue to rotate until the next succeeding article on platform 25 engages actuator 74 to operate switch 73 as previously described. The rotation of clutch 55 will, as previously described, rotate the shaft 52 and thereby effect movement of the feeding station conveyor chain 26. Rotation of the shaft 52 also effects rotation of the arm 53 and pusher bar 65 which sweeps out across the platform 25 to engage and shift an article in transfer position on the platform 25 onto the main conveyor platform 21 in the identified space between pusher bars 23. As the pusher bar 65 is rotated about the axis of the shaft 52 it will rotate also about the axis of its pivotal mounting at the end of arm 53 due to the operation of the chain 67 engaging the stationary sprocket 54 and the sprocket 66 rotatable with the pusher bar arm 64. The transfer pusher bar 65 will therefore move inwardly to a maximum position spaced from the axis of the shaft 52 by the sum of the effective dimensions of the arms 53 and 64.

At feeding station B an article 24 is shown halfway transferred from the loading conveyor platform to the main conveyor platform. At feeding station C the article is shown just prior to its final movement onto the main conveyor platform. During the shifting of the article it will also be moved along platform 25 by the pusher bar 27 on chain 26, which during this operation is moving at the same speed as the main conveyor chain 22. A smooth transfer of the article from one conveyor to the other is thereby effected, a pusher bar 23 engaging the article after it moves beyond the pusher bar 27. At feeding station D the transfer pusher bar 65 has just begun its retracting movement and is out of contact with the transferred article, and at feeding station E the pusher bar is further retracted, with the arm 53 and the clutch 55 rotated through substantially 180 degrees. The clutch 55 continues to rotate to return the arm 53 and the transfer pusher bar 65 into the position of station A, at which point the pawl 57 engages the stop on the clutch element 58.

When an article 24 is shifted out of the transfer position, switch 73 resumes its normal position but is reoperated by the following article in the next space on the loading conveyor platform and again opens the direct circuit to the solenoid 56 and sets up the coding circuit for its next operation.

If, in the above operation, an article already occupies the main conveyor space identified with the actuating coding lug, switch 78 will be opened to prevent completion of the coding circuit and the article in transfer position will remain there.

The circuits for the delivery station F through O are shown at the right hand side of FIGURE 2a. Switch 133 is normally closed and will be opened only when an article is in the discharge chute in position to interfere with the delivery of a new article to the chute. Switch 106 is unnecessary to the operation of the delivery station but is included to keep the station from operating if there is no article in the conveyor space, thus preventing unnecessary operation and wear on the delivery station. Assuming that a coding lug 101 identifying a particular article space engages a coding switch 94 selected to call for the article in that space, that coding switch will close to energize the associated solenoid 121. This retracts pawl 122 and permits rotation of the one revolution clutch 116, thus connecting shaft 118 to sprocket 114 for one complete revolution therewith. Sprocket 114 is continuously rotated by chain 113 which engages sprocket 112 rotating with sprocket 111 driven by the main conveyor chain 22. Rotation of shaft 118 rotates the arm 119 and therewith the arm 123 and the transfer pusher bar 124. As the arm 119 rotates, the chain 126 effects rotation of arm 123 through the interaction of the stationary sprockets 127 and the sprocket 125 rotatable with arm 123 to maintain the surface of the bar 124 always parallel to the axis of the conveyor. Successive positions of the arm 119 and 123 and of the transfer bar 124 are shown in delivery stations H through O. At station K the transfer pusher bar 124 is shown at approximately its maximum extension across the conveyor platform, shown in FIGURE 8, and by this time the article will have tipped onto the discharge chute conveyor and will ride down the rolls 132 under the action of gravity. At the completion of a full revolution of the clutch 116, the pawl 122 engages the stop on the clutch element to stop the clutch and the shaft 118 until the solenoid 121 is again energized by the closing of its associated coding switch 94 by a correspondingly positioned lug 101.

If an article in passing along the main conveyor does not find an empty discharge chute coded to receive it, the article will continue around the conveyor and will open the switches 78 at the feeding stations, thus preventing transfer of another article into the space which it already occupies. This article will continue around the main conveyor until it finds an empty discharge chute for which its space is coded, whereupon the delivery station for that discharge chute will effect transfer of the article to the chute.

It will be noted that there should be at least one feeding station for each separate type of article being fed at any one time, although several feeding stations may be utilized to feed the same type of article, and while all of the feeding stations have been shown as located at one place and the delivery and discharge stations at another, as being a more practical arrangement for the system under consideration, it is readily seen that feeding and delivery stations may be intermixed and may even be rearranged without extensive wiring or other sequence changes.

As specifically illustrated, the conveyor delivery system according to the present invention has been shown as driven by a single motor, with the push-on and push-off transfer units actuated from the main conveyor chain. It will be understood that the stations may readily be adapted for individual motor drive and may be synchronized with the main drive by having all of the drive motors synchronously energized from a common source whose frequency may be varied to vary the speed of all of the units in approximate timed unison. Also, while a specific form of transfer unit has been shown in connection with the feeding and delivery stations, in certain aspects of the invention simplified shifting or transfer means, as for example a simple air device, can be utilized. Also, instead of a single movable coding switch 94, a series of switches rigidly mounted and controlled by a selector switch could be used in place of a movable switch.

While certain specified embodiments of the invention have been specifically shown and described, it will be understood that the invention is not limited thereto as many variations will be apparent to those skilled in the art, and the invention is to be given its broadest interpretation within the terms of the following claims.

I claim:

1. A conveyor delivery system comprising: a plurality of article feeding stations; a plurality of article-receiving discharge stations; conveyor means interconnecting said feeding and discharge stations and having a plurality of article receiving spaces thereon; coding means for each of said feeding and discharge stations identifying the station with which it is associated by its position relative to the path of said conveyor means; coding means on said conveyor means for each of said article spaces thereon, said conveyor coding means being relatively offset in positions aligning with the positions of said feeding and discharge station coding means to coact therewith to associate each article space with selected feeding and discharge stations; means responsive to the actuation of a discharge station coding means for transferring an article from the conveyor space identified by the actuating conveyor coding means to that discharge station; and means responsive to the absence of an article from the identified conveyor space for preventing operation of said transfer means.

2. A conveyor delivery system comprising: a main conveyor having a plurality of article spaces thereon; a feeding conveyor parallel to said first conveyor to move an article into a feeding station from which it is transferred to a selected space on said main conveyor; means controlled by the absence of an article from the feeding station for driving said feeding conveyor; means operated by an article entering said feeding station for signalling the stopping of said feeding conveyor; coding means at said feeding station identifying the station; coding means on said conveyor identifying the spaces thereon and selecting by their positions the spaces to be filled from said feeding station; and transfer means activated by the cooperating coding means for effecting transfer of an article from the feeding station to the selected space on the main conveyor.

3. A conveyor delivery system comprising: a main conveyor having a plurality of article spaces thereon; a feeding conveyor parallel to said first conveyor to move an article into a feeding station from which it is transferred to a selected space on said main conveyor; means controlled by the absence of an article from the feeding station for driving said feeding conveyor; means operated by an article entering said feeding station for signalling the stopping of said feeding conveyor; coding means at said feeding station identifying the station; coding means on said conveyor identifying the spaces thereon and selecting by their positions the spaces to be filled from said feeding station; transfer means activated by the cooperating coding means for effecting transfer of an article from the feeding station to the selected space on the main conveyor; and means for driving said feeding conveyor concurrently with the operation of said transfer means and at the same speed as said main delivery conveyor.

4. A conveyor delivery system comprising: a main conveyor having a plurality of article spaces thereon; a feeding conveyor parallel to said first conveyor to move an article into a feeding station from which it is transferred to a selected space on said main conveyor; means controlled by the absence of an article from the feeding station for driving said feeding conveyor; means operated by an article entering said feeding station for signalling the stopping of said feeding conveyor; coding means at said feeding station identifying the station; coding means on said conveyor identifying the spaces thereon and selecting by their positions the spaces to be filled from said feeding station; transfer means activated by the cooperating coding means for effecting transfer of an article from the feeding station to the selected space on the main conveyor; means including a one revolution clutch for driving said feeding conveyor and said transfer means concurrently from said main conveyor; means energizing said clutch for continuous operation while an article remains out of said feeding station; means de-energizing said clutch for continued but single revolution operation as an article enters said feeding station and also effecting a preliminary set up of a coding circuit to the clutch; and means completing the set up of said coding circuit upon termination of the single clutch revolution after de-energization.

5. In a conveyor system,
 a main conveyor having article-advancing portions spaced therealong,
 a plurality of feed devices spaced along the conveyor for feeding articles to the conveyor,
 a plurality of delivery devices spaced along the conveyor for removing articles from the conveyor,
 a plurality of actuators one for each advancing portion of the conveyor,
 a plurality of first mounting members fixed to the conveyor in positions extending transversely thereof and mounting the actuators for manual adjustment of the actuators transversely of the conveyor to selected individual positions relative to the conveyor,
 a plurality of second mounting members positioned adjacent the feed devices in positions parallel to and close to the path of the first mounting members,
 a plurality of first actuating devices selectively and adjustably mounted on the second mounting members in positions in which selected ones of the first actuating devices are actuated by selectively positioned ones of the actuators as the actuators travel therepast and each first actuating device serving when actuated to actuate the feed device associated therewith to move an article onto the conveyor,
 a plurality of third mounting members positioned adjacent the delivery devices in positions parallel to and close to the path of the first mounting members,
 and a plurality of second actuating devices selectively and adjustably mounted on the third mounting members in positions in which selected ones of the second actuating devices are actuated by selectively positioned ones of the actuators as the actuators travel therepast and each second actuating device serving when actuated to actuate the delivery device associated therewith to remove an article from the conveyor.

References Cited by the Examiner

UNITED STATES PATENTS

| | | | |
|---|---|---|---|
| 1,626,359 | 4/27 | Rundell | 198—38 X |
| 2,667,260 | 1/54 | Pyles | 198—38 |
| 2,796,975 | 6/57 | Costa | 198—203 |
| 2,844,242 | 7/58 | Panuline | 198—168 |
| 3,026,988 | 3/62 | Fisk | 198—24 |
| 3,082,855 | 3/63 | Habicht | 198—38 X |

SAMUEL F. COLEMAN, *Primary Examiner.*

EDWARD A. SROKA, *Examiner.*

UNITED STATES PATENT OFFICE
CERTIFICATE OF CORRECTION

Patent No. 3,212,623                               October 19, 1965

Earl G. Griffith

It is hereby certified that error appears in the above numbered patent requiring correction and that the said Letters Patent should read as corrected below.

Column 10, after line 39, insert the following:

3,105,601      10/63      Smoll------198-38 X

Signed and sealed this 20th day of September 1966.

(SEAL)
Attest:

ERNEST W. SWIDER
Attesting Officer

EDWARD J. BRENNER
Commissioner of Patents